United States Patent
Hung et al.

(10) Patent No.: US 12,174,375 B1
(45) Date of Patent: Dec. 24, 2024

(54) HEAD-MOUNTED DISPLAY DEVICE AND ZOOMABLE OPTICAL DEVICE THEREOF

(71) Applicants: INTERFACE TECHNOLOGY (CHENGDU) CO., LTD., Chengdu (CN); INTERFACE OPTOELECTRONICS (SHENZHEN) CO., LTD, Shenzhen (CN); GENERAL INTERFACE SOLUTION LIMITED, Miaoli County (TW)

(72) Inventors: Kun-Chih Hung, Shenzhen (CN); Ting-Hui Chen, Shenzhen (CN); Po-Lun Chen, Shenzhen (CN); Yun-Pei Chen, Shenzhen (CN)

(73) Assignees: Interface Technology (Chengdu) Co., Ltd., Chengdu (CN); Interace Optoelectronics (Shenzhen) Co., Ltd., Shenzhen (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/461,106

(22) Filed: Sep. 5, 2023

(30) Foreign Application Priority Data

Jul. 27, 2023 (CN) .......................... 202310938893.3

(51) Int. Cl.
*G02F 1/1335* (2006.01)
*G02B 27/01* (2006.01)
*G02B 27/28* (2006.01)
*G02F 1/29* (2006.01)

(52) U.S. Cl.
CPC ......... *G02B 27/0101* (2013.01); *G02B 27/01* (2013.01); *G02F 1/133526* (2013.01); *G02F 1/133536* (2013.01); *G02F 1/133607* (2021.01); *G02B 27/283* (2013.01); *G02F 1/29* (2013.01)

(58) Field of Classification Search
CPC ......... G02F 1/133526; G02F 1/133607; G02F 1/133536
See application file for complete search history.

(56) References Cited

U.S. PATENT DOCUMENTS

| 2019/0384070 A1* | 12/2019 | Geng | G02B 27/28 |
| 2020/0041795 A1* | 2/2020 | Yamaguchi | G02B 3/08 |
| 2023/0004015 A1* | 1/2023 | Wang | G02B 27/286 |

* cited by examiner

*Primary Examiner* — Dung T Nguyen
(74) *Attorney, Agent, or Firm* — Rosenberg, Klein & Lee

(57) ABSTRACT

A head-mounted display device and a zoomable optical device thereof is disclosed. The zoomable optical device includes a polarization reflection film, a waveplate, a half-mirror film, and a zoomable module. The zoomable module includes a first conductive light-transmitting substrate, a second conductive light-transmitting substrate, and a third conductive light-transmitting substrate. The third conductive light-transmitting substrate is arranged between the first conductive light-transmitting substrate and the second conductive light-transmitting substrate. The first conductive light-transmitting substrate is adhered to the waveplate with an optical-grade transparent adhesive. The polarization reflection film is directly arranged on the second conductive light-transmitting substrate. There is no substrate between the first conductive light-transmitting substrate and the third conductive light-transmitting substrate, and there is no substrate between the second conductive light-transmitting substrate and the third conductive light-transmitting substrate.

21 Claims, 3 Drawing Sheets

HEAD-MOUNTED DISPLAY DEVICE AND ZOOMABLE OPTICAL DEVICE THEREOF

This application claims priority for the CN patent application No. 202310938893.3 filed on 27 Jul. 2023, the content of which is incorporated by reference in its entirely.

BACKGROUND OF THE INVENTION

Field of the Invention

The present invention relates to display technology, particularly to a head-mounted display device and a zoomable optical device thereof.

Description of the Related Art

With the rapid development of science and technology, people's demand for multimedia video information is increasing day by day. Generally, common multimedia playback devices are equipped with liquid crystal displays (LCDs) or light-emitting diode (LED) displays to display images. However, the pixels and size of images displayed by the display will be limited by the size and performance of the display. The visual effect of the display is limited. It is easy to cause eye fatigue when the display is used for a long time.

Therefore, a head-mounted display (HMD) has appeared on the market. The head-mounted display is an optical product for stereoscopic vision display. It transmits the signal with the stereoscopic effect of binocular disparity to the eyes through the display elements and optical lenses arranged in front of the eyes in sequence, thereby producing a stereoscopic and large-image. Head-mounted displays are usually used in augmented reality (AR) systems or virtual reality (VR) systems. In addition to moving with the user, the HMD can also be used as an input device to receive the user's response. Besides, images and texts can also be added to the images watched by users to achieve the effect of virtual reality or augmented reality. However, since the imaging distance of the AR system or VR system is relatively long, the lens needs to be kept at a certain distance from the human eye. In order to improve this problem, the Pancake lens is used. On top of that, in order to add multiple functions to the head-mounted display, such as adjusting the diopter, the thickness of the lens module is too thick. Therefore, the head-mounted display gives people a bulky feeling, causing inconvenience to the user.

To overcome the abovementioned problems, the present invention provides a head-mounted display device and a zoomable optical device thereof, so as to solve the aforementioned problems of the prior art.

SUMMARY OF THE INVENTION

The present invention provides a head-mounted display device and a zoomable optical device thereof to have light and thin properties.

In an embodiment of the present invention, a zoomable optical device includes a polarization reflection film, a waveplate, a half-mirror film, and a zoomable module. The waveplate has a first surface and a second surface opposite to each other. The half-mirror film is arranged on the first surface of the waveplate. The zoomable module includes a first conductive light-transmitting substrate, a second conductive light-transmitting substrate, and a third conductive light-transmitting substrate. The third conductive light-transmitting substrate is arranged between the first conductive light-transmitting substrate and the second conductive light-transmitting substrate. The first conductive light-transmitting substrate is adhered to the second surface of the waveplate with an optical-grade transparent adhesive. The polarization reflection film is directly arranged on the second conductive light-transmitting substrate. There is no substrate between the first conductive light-transmitting substrate and the third conductive light-transmitting substrate. There is no substrate between the second conductive light-transmitting substrate and the third conductive light-transmitting substrate.

In an embodiment of the present invention, the waveplate is a quarter waveplate.

In an embodiment of the present invention, the first conductive light-transmitting substrate, the second conductive light-transmitting substrate, and the third conductive light-transmitting substrate are planar substrates, flat-convex substrates, convex-concave substrates, cylindrical substrates, or curved substrates.

In an embodiment of the present invention, the zoomable module further includes at least one solid lens, a first liquid-crystal layer, a polarization dependent lens, and a second liquid-crystal layer. The first liquid-crystal layer is arranged between the first conductive light-transmitting substrate and the third conductive light-transmitting substrate. The polarization dependent lens is arranged between the third conductive light-transmitting substrate and the solid lens. The second liquid-crystal layer is arranged between the solid lens and the second conductive light-transmitting substrate.

In an embodiment of the present invention, the solid lens is an aspherical lens.

In an embodiment of the present invention, the solid lens is a non-polarization dependent lens.

In an embodiment of the present invention, the polarization dependent lens is implemented with a liquid-crystal layer.

In an embodiment of the present invention, the first surface of the waveplate faces toward the display surface of a display module through the half-mirror film and the display module is configured to transmit circularly-polarized images to the half-mirror film.

In an embodiment of the present invention, the display module is a liquid-crystal display, a micro-organic light-emitting diode (μ-OLED) module, a liquid-crystal-on-silicon display module, a digital light-processing module, or micro light-emitting diode display module.

In an embodiment of the present invention, the solid lens is a Fresnel lens, a plano-convex lens, or a plano-concave lens.

In an embodiment of the present invention, the zoomable module is configured to control the diopter of incident light and maintain or change the polarization state of an incident polarized image according to the polarization state of the incident polarized image.

In an embodiment of the present invention, a head-mounted display device includes a polarization reflection film, a waveplate, a half-mirror film, a zoomable module, and a display module. The waveplate has a first surface and a second surface opposite to each other. The half-mirror film is arranged on the first surface of the waveplate. The zoomable module includes a first conductive light-transmitting substrate, a second conductive light-transmitting substrate, and a third conductive light-transmitting substrate. The third conductive light-transmitting substrate is arranged between the first conductive light-transmitting substrate and the second conductive light-transmitting substrate. The first conductive light-transmitting substrate is adhered to the second surface of the waveplate with an optical-grade transparent adhesive. The polarization reflection film is directly arranged on the second conductive light-transmitting substrate. There is no substrate between the first conductive light-transmitting substrate and the third conductive light-transmitting substrate. There is no substrate between the second conductive light-transmitting substrate and the third conductive light-transmitting substrate. The display module has a display surface that faces toward the first surface of the waveplate through the half-mirror film. The display module is configured to transmit circularly-polarized images to the half-mirror film.

In an embodiment of the present invention, the waveplate is a quarter waveplate.

In an embodiment of the present invention, the first conductive light-transmitting substrate, the second conductive light-transmitting substrate, and the third conductive light-transmitting substrate are planar substrates, flat-convex substrates, convex-concave substrates, cylindrical substrates, or curved substrates.

In an embodiment of the present invention, the zoomable module further includes at least one solid lens, a first liquid-crystal layer, a polarization dependent lens, and a second liquid-crystal layer. The first liquid-crystal layer is arranged between the first conductive light-transmitting substrate and the third conductive light-transmitting substrate. The polarization dependent lens is arranged between the third conductive light-transmitting substrate and the solid lens. The second liquid-crystal layer is arranged between the solid lens and the second conductive light-transmitting substrate.

In an embodiment of the present invention, the solid lens is an aspherical lens.

In an embodiment of the present invention, the solid lens is a non-polarization dependent lens.

In an embodiment of the present invention, the polarization dependent lens is implemented with a liquid-crystal layer.

In an embodiment of the present invention, the display module is a liquid-crystal display, a micro-organic light-emitting diode (μ-OLED) module, a liquid-crystal-on-silicon display module, a digital light-processing module, or micro light-emitting diode display module.

In an embodiment of the present invention, the solid lens is a Fresnel lens, a plano-convex lens, or a plano-concave lens.

In an embodiment of the present invention, the zoomable module is configured to control the diopter of incident light and maintain or change the polarization state of an incident polarized image according to the polarization state of the incident polarized image.

In an embodiment of the present invention, the head-mounted display device and the zoomable optical device employ the zoomable module. The zoomable module includes the first conductive light-transmitting substrate, the second conductive light-transmitting substrate, and the third conductive light-transmitting substrate. The third conductive light-transmitting substrate is located between the first conductive light-transmitting substrate and the second conductive light-transmitting substrate. There is no substrate between the first conductive light-transmitting substrate and the third conductive light-transmitting substrate. There is no substrate between the second conductive light-transmitting substrate and the third conductive light-transmitting substrate. As a result, the head-mounted display device and the zoomable optical device have light and thin properties.

Below, the embodiments are described in detail in cooperation with the drawings to make easily understood the technical contents, characteristics and accomplishments of the present invention.

DETAILED DESCRIPTION OF THE INVENTION

Figure 1:
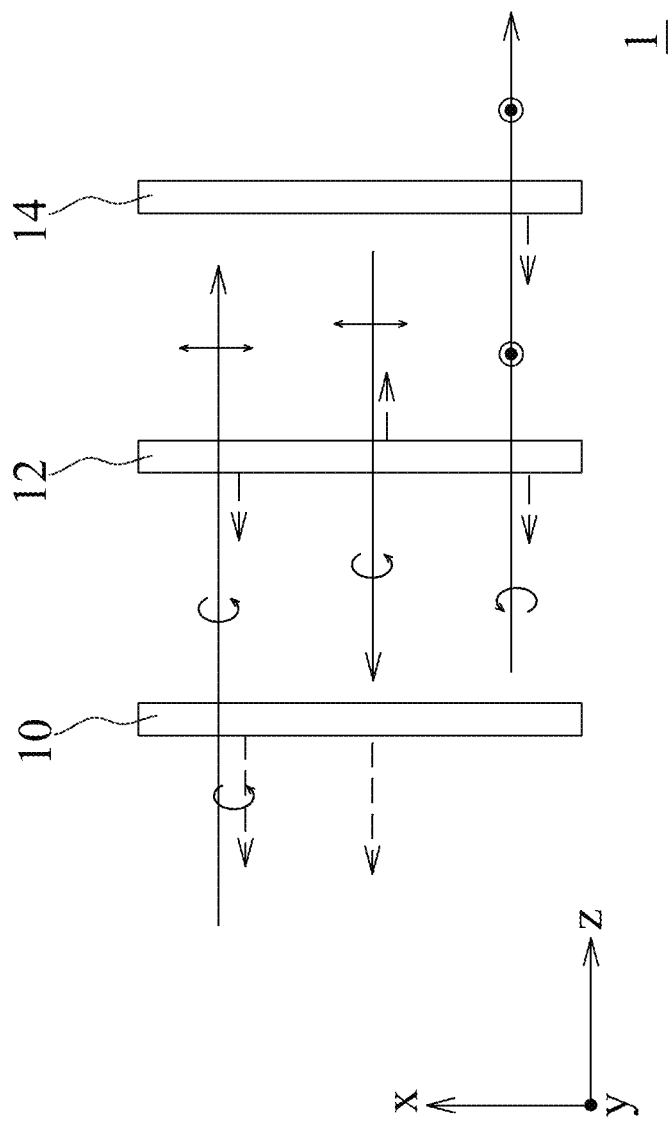
FIG. 1 is a schematic diagram illustrating the Pancake lens.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

In the following description, a head-mounted display device and a zoomable optical device will be provided, which employ a zoomable module. The zoomable module includes a first conductive light-transmitting substrate, a second conductive light-transmitting substrate, and a third conductive light-transmitting substrate. The third conductive light-transmitting substrate is located between the first conductive light-transmitting substrate and the second conductive light-transmitting substrate. There is no substrate between the first conductive light-transmitting substrate and the third conductive light-transmitting substrate. There is no substrate between the second conductive light-transmitting substrate and the third conductive light-transmitting substrate. As a result, the head-mounted display device and the zoomable optical device have light and thin properties.

FIG. 1 is a schematic diagram illustrating the Pancake lens. In the development of head-mounted displays, especially virtual reality (VR) displays, the Pancake lens has become mainstream because it can fold the optical path and reduce weight and space. The principle of the Pancake lens is to convert the polarization state of polarized light and reflect the polarized light, so as to achieve the effect of folding the optical path between the half mirror and the reflective polarizer. Because the optical path is folded, the light can pass through the lens located between the half mirror and the reflective polarizer three times. Thus, the lens located between the half mirror and the reflective polarizer in the Pancake lens can contribute diopters three times, such that the Pancake lens has a thin and small volume. As illustrated in FIG. 1, the Pancake lens 1 includes a half mirror 10, a quarter waveplate 12, and a reflective polarizer 14. The half mirror 10 reflects half of the light, such that half of the light passes through the half mirror 10. The half mirror 10 changes the polarization state of the circularly-polarized light, such as reflecting left circularly-polarized light to form right circularly-polarized light or reflecting right circularly-polarized light to form left circularly-polarized light. The quarter waveplate 12 converts circularly-polarized light into linearly-polarized light or converts linearly-polarized light into circularly-polarized light. The reflective polarizer 14 reflects linearly-polarized light in a first direction and linearly polarized light in a second direction passes through the reflective polarizer 14. The first direction is perpendicular to the second direction. In FIG. 1, both the solid line arrow and the dotted line arrow represent the traveling direction of light. The right circularly-polarized light passes through the half mirror 10 and the quarter waveplate 12 in sequence. The quarter waveplate 12 converts the right circularly-polarized light into x polarized light. The reflective polarizer 14 reflects x polarized light. The quarter waveplate 12 converts x polarized light into right circular-polarized light. The half mirror 10 reflects right circularly-polarized light to form left circularly-polarized light. The left circular-polarized light passes through the quarter waveplate 12 to form y polarized light. The y polarized light directly passes through the reflective polarizer 14. The Pancake lens is applied to the head-mounted display device and the zoom optical device thereof of the present invention.

Figure 2:
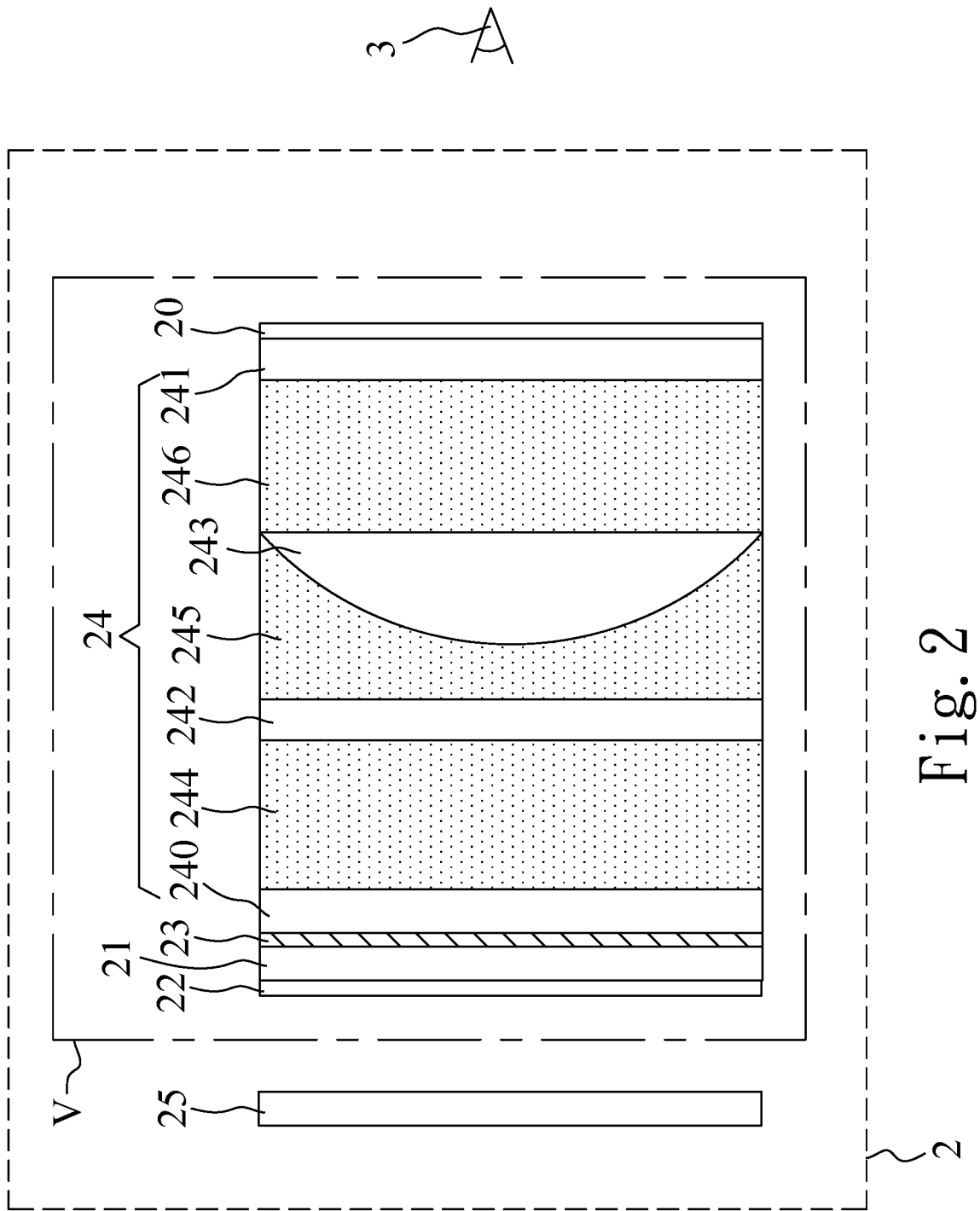
FIG. 2 is a schematic diagram illustrating a head-mounted display device and a zoomable optical device according to a first embodiment of the present invention.

FIG. 2 is a schematic diagram illustrating a head-mounted display device and a zoomable optical device according to a first embodiment of the present invention. Referring to FIG. 2, the first embodiment of a head-mounted display 2 is introduced as follows. The head-mounted display 2 includes a zoomable optical device V. The zoomable optical device V includes a polarization reflection film 20, a waveplate 21, a half-mirror film 22, an optical-grade transparent adhesive 23, and a zoomable module 24. In addition to the zoomable optical device V, the head-mounted display 2 further includes a display module 25. The waveplate 21 may be, but not limited to, a quarter waveplate. The display module 25 may be, but not limited to, a liquid-crystal display, a micro-organic light-emitting diode (μ-OLED) module, a liquid-crystal-on-silicon display module, a digital light-processing module, or micro light-emitting diode display module. The optical-grade transparent adhesive 23 may be, but not limited to, an optical adhesive or a pressure sensitive adhesive (PSA). The waveplate 21 has a first surface and a second surface opposite to each other. The half-mirror film 22 is arranged on the first surface of the waveplate 21. The zoomable module 24 includes a first conductive light-transmitting substrate 240, a second conductive light-transmitting substrate 241, and a third conductive light-transmitting substrate 242. Each of the first conductive light-transmitting substrate 240, the second conductive light-transmitting substrate 241, and the third conductive light-transmitting substrate 242 includes a light-transmitting substrate and an electrode layer. In the first embodiment, the first conductive light-transmitting substrate 240, the second conductive light-transmitting substrate 241, and the third conductive light-transmitting substrate 242 are exemplified by planar substrates. The third conductive light-transmitting substrate 242 is arranged between the first conductive light-transmitting substrate 240 and the second conductive light-transmitting substrate 241. The third conductive light-transmitting substrate 242 is adhered to the second surface of the waveplate 21 with the optical-grade transparent adhesive 23. The polarization reflection film 20 is directly arranged on the second conductive light-transmitting substrate 241. That is to say, there is no substrate between the polarization reflection film 20 and the second conductive light-transmitting substrate 241. In order to effectively reduce the overall thickness of the head-mounted display 2 to have light and thin properties, there is no substrate between the first conductive light-transmitting substrate 240 and the third conductive light-transmitting substrate 242, and there is no substrate between the second conductive light-transmitting substrate 241 and the third conductive light-transmitting substrate 242. The first surface of the waveplate 21 faces toward the display surface of the display module 25 through the half-mirror film 22. The display module 25 is configured to transmit circularly-polarized images to the half-mirror film 22.

In some embodiments of the present invention, the zoomable module may further include at least one solid lens 243, a first liquid-crystal layer 244, a polarization dependent lens 245, and a second liquid-crystal layer 246. For convenience and clarity, the number of the solid lens 243 is one. In a preferred embodiment, the solid lens 243 may be an aspherical lens. The solid lens 243 may include plastic or glass and provide the necessary diopters to meet the requirement of the head-mounted display device 2. The solid lens 243 may be a curved lens, such as a Fresnel lens, a plano-convex lens, or a plano-concave lens. The polarization dependent lens 245 changes the refractive index and the focal length according to the polarization state of the incident light, where the focal length is the reciprocal of the diopter. The polarization dependent lens 245 may include a birefringent material. The polarization dependent lens 245 may be a liquid crystal polymer lens, a birefringent water glue or a curved phase retarder. In the first embodiment, the polarization dependent lens 245 is implemented with a liquid-crystal layer. The first liquid-crystal layer 244 is located between the first conductive light-transmitting substrate 240 and the third conductive light-transmitting substrate 242. The polarization dependent lens 245 is located between the third conductive light-transmitting substrate 242 and the solid lens 243. The second liquid-crystal layer 246 is located between the solid lens 243 and the second conductive light-transmitting substrate 241. The first conductive light-transmitting substrate 240, the first liquid-crystal layer 244, and the third conductive light-transmitting substrate 242 form a first polarization controller. The third conductive light-transmitting substrate 242, the second conductive light-transmitting substrate 241, and the second liquid-crystal layer 246 form a second polarization controller. When the first conductive light-transmitting substrate 240 and the third conductive light-transmitting substrate 242 are biased, the alignment direction of the liquid crystal molecules in the first liquid-crystal layer 244 is changed to change the polarization state of the incident light. When the third conductive light-transmitting substrate 242 and the second conductive light-transmitting substrate 241 are biased, the alignment direction of the liquid crystal molecules in the polarization dependent lens 245 is changed to change the polarization state of the incident light. In other words, the second polarization controller and the polarization dependent lens 245 share the third conductive light-transmitting substrate 242 and the second conductive light-transmitting substrate 241. Because the substrates are shared, the number of elements of the zoomable module 24 is reduced from six to four and the thickness of the zoomable module 24 is reduced by 2.3 mm.

The zoomable module 24 controls the diopter of the incident light and maintains or changes the polarization state of an incident polarized image according to the polarization state of the incident polarized image. Specifically, when the display module 25 emits left circularly-polarized light, the left circularly-polarized light passes through the half-mirror film 22 and the waveplate 21 in sequence to form horizontally-polarized light. When the horizontally polarized light passes through the optical-grade transparent adhesive 23, the first conductive light-transmitting substrate 240, the first liquid-crystal layer 244, the third conductive light-transmitting substrate 242, the polarization dependent lens 245, and the solid state lens 243 in sequence, the focal length and diopter of the zoomable module 24 are determined according to the polarization state of the horizontally-polarized light. When the horizontally-polarized light passes through the second liquid-crystal layer 246, the liquid crystal molecules of the second liquid-crystal layer 246 can maintain the polarization state of the horizontally-polarized light or convert the horizontally-polarized light into vertically-polarized light. When the second liquid-crystal layer 246 converts the horizontally-polarized light into vertically-polarized light, the vertically-polarized light passes through the second conductive light-transmitting substrate 241 and the polarization reflection film 20 in sequence and enters a human eye 3. If the second liquid-crystal layer 246 maintains the polarization state of the horizontally polarized light, the polarization reflection film 20 reflects the horizontally-polarized light, so that the horizontally-polarized light passes through the zoomable module 24, the optical-grade transparent adhesive 23, the waveplate 21 and the half-mirror film 22 in sequence. The waveplate 21 converts the horizontally-polarized light into left circularly-polarized light. The half-mirror film 22 reflects the left circularly-polarized light to form right circularly-polarized light. When the right circularly-polarized light passes through the waveplate 21, the waveplate 21 converts the right circularly-polarized light into vertically-polarized light. The vertically-polarized light passes through the optical-grade transparent adhesive 23, the zoomable module 24 and the polarization reflection film 20 in sequence and enters the human eye 3.

Figure 3:
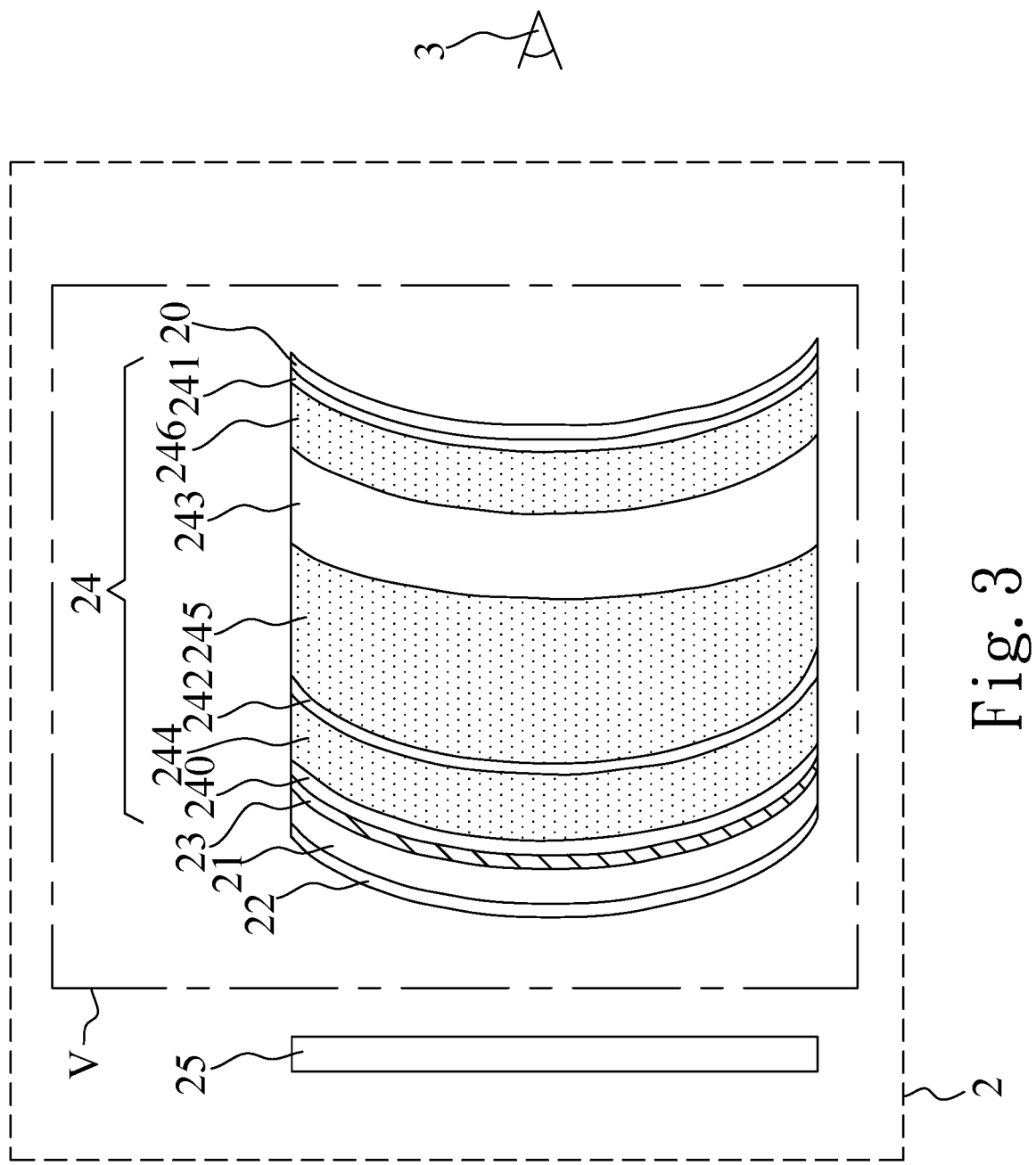
FIG. 3 is a cross-sectional view of a head-mounted display device and a zoomable optical device according to a second embodiment of the present invention.

FIG. 3 is a cross-sectional view of a head-mounted display device and a zoomable optical device according to a second embodiment of the present invention. Referring to FIG. 3, the second embodiment of the head-mounted display device 2 is introduced as follows. In addition to the planar substrates, the first conductive light-transmitting substrate 240, the second conductive light-transmitting substrate 241, and the third conductive light-transmitting substrate 242 can be alternatively flat-convex substrates, convex-concave substrates, cylindrical substrates, or curved substrates. In the second embodiment, the first conductive light-transmitting substrate 240, the second conductive light-transmitting substrate 241, and the third conductive light-transmitting substrate 242 are curved substrates. The other technical features of the second embodiment are the same as those of the first embodiment so they will not be reiterated.

According to the embodiments provided above, the head-mounted display device and the zoomable optical device have light and thin properties.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A zoomable optical device comprising:
 a polarization reflection film;
 a waveplate having a first surface and a second surface opposite to each other;
 a half-mirror film arranged on the first surface of the waveplate; and
 a zoomable module comprising a first conductive light-transmitting substrate, a second conductive light-transmitting substrate, and a third conductive light-transmit- ting substrate, wherein the third conductive light-transmitting substrate is arranged between the first conductive light-transmitting substrate and the second conductive light-transmitting substrate, the first conductive light-transmitting substrate is adhered to the second surface of the waveplate with an optical-grade transparent adhesive, the polarization reflection film is directly arranged on the second conductive light-transmitting substrate, there is no substrate between the first conductive light-transmitting substrate and the third conductive light-transmitting substrate, and there is no substrate between the second conductive light-transmitting substrate and the third conductive light-transmitting substrate.

2. The zoomable optical device according to claim 1, wherein the waveplate is a quarter waveplate.

3. The zoomable optical device according to claim 1, wherein the first conductive light-transmitting substrate, the second conductive light-transmitting substrate, and the third conductive light-transmitting substrate are planar substrates, flat-convex substrates, convex-concave substrates, cylindrical substrates, or curved substrates.

4. The zoomable optical device according to claim 1, wherein the zoomable module further comprises:
   at least one solid lens;
   a first liquid-crystal layer arranged between the first conductive light-transmitting substrate and the third conductive light-transmitting substrate;
   a polarization dependent lens arranged between the third conductive light-transmitting substrate and the at least one solid lens; and
   a second liquid-crystal layer arranged between the at least one solid lens and the second conductive light-transmitting substrate.

5. The zoomable optical device according to claim 4, wherein the at least one solid lens is an aspherical lens.

6. The zoomable optical device according to claim 4, wherein the at least one solid lens is a non-polarization dependent lens.

7. The zoomable optical device according to claim 4, wherein the polarization dependent lens is implemented with a liquid-crystal layer.

8. The zoomable optical device according to claim 4, wherein the at least one solid lens is a Fresnel lens, a plano-convex lens, or a plano-concave lens.

9. The zoomable optical device according to claim 1, wherein the first surface of the waveplate faces toward a display surface of a display module through the half-mirror film and the display module is configured to transmit circularly-polarized images to the half-mirror film.

10. The zoomable optical device according to claim 9, wherein the display module is a liquid-crystal display, a micro-organic light-emitting diode (μ-OLED) module, a liquid-crystal-on-silicon display module, a digital light-processing module, or micro light-emitting diode display module.

11. The zoomable optical device according to claim 1, wherein the zoomable module is configured to control a diopter of incident light and maintain or change a polarization state of an incident polarized image according to the polarization state of the incident polarized image.

12. A head-mounted display device comprising:
   a polarization reflection film;
   a waveplate having a first surface and a second surface opposite to each other;
   a half-mirror film arranged on the first surface of the waveplate;
   a zoomable module comprising a first conductive light-transmitting substrate, a second conductive light-transmitting substrate, and a third conductive light-transmitting substrate, wherein the third conductive light-transmitting substrate is arranged between the first conductive light-transmitting substrate and the second conductive light-transmitting substrate, the first conductive light-transmitting substrate is adhered to the second surface of the waveplate with an optical-grade transparent adhesive, the polarization reflection film is directly arranged on the second conductive light-transmitting substrate, there is no substrate between the first conductive light-transmitting substrate and the third conductive light-transmitting substrate, and there is no substrate between the second conductive light-transmitting substrate and the third conductive light-transmitting substrate; and
   a display module whose display surface faces toward the first surface of the waveplate through the half-mirror film, wherein the display module is configured to transmit circularly-polarized images to the half-mirror film.

13. The head-mounted display device according to claim 12, wherein the waveplate is a quarter waveplate.

14. The head-mounted display device according to claim 12, wherein the first conductive light-transmitting substrate, the second conductive light-transmitting substrate, and the third conductive light-transmitting substrate are planar substrates, flat-convex substrates, convex-concave substrates, cylindrical substrates, or curved substrates.

15. The head-mounted display device according to claim 12, wherein the zoomable module further comprises:
   at least one solid lens;
   a first liquid-crystal layer arranged between the first conductive light-transmitting substrate and the third conductive light-transmitting substrate;
   a polarization dependent lens arranged between the third conductive light-transmitting substrate and the at least one solid lens; and
   a second liquid-crystal layer arranged between the at least one solid lens and the second conductive light-transmitting substrate.

16. The head-mounted display device according to claim 15, wherein the at least one solid lens is an aspherical lens.

17. The head-mounted display device according to claim 15, wherein the at least one solid lens is a non-polarization dependent lens.

18. The head-mounted display device according to claim 17, wherein the polarization dependent lens is implemented with a liquid-crystal layer.

19. The head-mounted display device according to claim 15, wherein the at least one solid lens is a Fresnel lens, a plano-convex lens, or a plano-concave lens.

20. The head-mounted display device according to claim 12, wherein the display module is a liquid-crystal display, a micro-organic light-emitting diode (μ-OLED) module, a liquid-crystal-on-silicon display module, a digital light-processing module, or micro light-emitting diode display module.

21. The head-mounted display device according to claim 12, wherein the zoomable module is configured to control a diopter of incident light and maintain or change a polarization state of an incident polarized image according to the polarization state of the incident polarized image.

* * * * *